(12) United States Patent
Nancekievill

(10) Patent No.: US 7,428,632 B2
(45) Date of Patent: *Sep. 23, 2008

(54) BRANCH PREDICTION MECHANISM USING A BRANCH CACHE MEMORY AND AN EXTENDED PATTERN CACHE

(75) Inventor: Alexander Nancekievill, Great Abington (GB)

(73) Assignee: ARM Limited, Cambridge (GB)

( * ) Notice: Subject to any disclaimer, the term of this patent is extended or adjusted under 35 U.S.C. 154(b) by 195 days.

This patent is subject to a terminal disclaimer.

(21) Appl. No.: 11/088,265

(22) Filed: Mar. 24, 2005

(65) Prior Publication Data

US 2006/0095749 A1    May 4, 2006

(51) Int. Cl.
*G06F 15/00* (2006.01)
*G06F 9/44* (2006.01)
*G06F 9/00* (2006.01)

(52) U.S. Cl. .............. 712/240; 712/239; 712/233; 712/234; 712/241

(58) Field of Classification Search ......... 712/240, 712/239, 233, 234, 241
See application file for complete search history.

(56) References Cited

U.S. PATENT DOCUMENTS

| 5,513,330 | A | * | 4/1996 | Stiles ............... 712/204 |
| 6,374,349 | B1 | * | 4/2002 | McFarling .......... 712/239 |
| 6,502,188 | B1 | * | 12/2002 | Zuraski et al. ....... 712/234 |
| 6,553,488 | B2 | * | 4/2003 | Yeh et al. ............ 712/239 |
| 6,640,298 | B1 | * | 10/2003 | Totsuka et al. ....... 712/239 |
| 7,024,545 | B1 | * | 4/2006 | Zuraski et al. ....... 712/240 |
| 2004/0123075 | A1 | * | 6/2004 | Almog ............... 712/207 |
| 2004/0225870 | A1 | * | 11/2004 | Srinivasan et al. .... 712/235 |
| 2005/0149707 | A1 | * | 7/2005 | Jourdan et al. ....... 712/239 |
| 2006/0036837 | A1 | * | 2/2006 | Stark et al. .......... 712/239 |

OTHER PUBLICATIONS

Confidence estimation for speculation control Grunwald, D.; Klauser, A.; Manne, S.; Pleszkun, A.; Jun. 1-Jul. 1998 pp. 122-131.*

* cited by examiner

*Primary Examiner*—Eddie P Chan
*Assistant Examiner*—Idriss Alrobaye
(74) *Attorney, Agent, or Firm*—Nixon & Vanderhye P.C.

(57) ABSTRACT

A branch prediction mechanism includes a branch prediction memory and an extended pattern cache. The extended pattern cache detects predetermined repeating patterns of branch outcomes and stores a plurality of compressed representations of these such that when they recur their termination can be predicted. This enables program loops which are longer in length than can be represented within a reasonably sized branch prediction memory to nevertheless be detected and have their loop ends predicted.

22 Claims, 7 Drawing Sheets

BRANCH PREDICTION MECHANISM USING A BRANCH CACHE MEMORY AND AN EXTENDED PATTERN CACHE

BACKGROUND OF THE INVENTION

1. Field of the Invention

This invention relates to the field of data processing systems. More particularly, this invention relates to data processing systems including branch prediction mechanisms.

2. Description of the Prior Art

It is known to provide data processing systems using a pipelined architecture in which multiple program instructions are subject to different stages of their processing within a sequence of pipeline stages. Instructions are fetched into the pipeline by a prefetch unit. A problem arises with conditional branch instructions which may or may not result in a change of program flow, this being unknown at the point at which they are inserted into the pipeline with subsequent instructions requiring to be fetched before it is actually determined whether or not the conditional branch will or will not be taken.

In order to deal with this situation, which can cause severe performance problems due to the requirement to flush the pipeline, refill the pipeline and restart execution should the incorrect instructions be fetched, it is known to provide branch prediction mechanisms within such data processing systems. Such branch prediction mechanisms seek to predict whether or not a particular conditional branch instruction will or will not be taken. It is known to keep a copy of previous branch behavior and when a new branch is encountered to use this stored record of a preceding number of branch outcomes to look up into a branch prediction memory to determine a prediction as to whether or not the conditional branch instruction just encountered will or will not be taken. Whilst this is an effective technique, it consumes circuit resources in terms of circuit area, cost, power consumption etc. As the patterns of preceding branch outcomes are increased in length in an effort to increase the accuracy of the prediction performed, there is a significant rise in the size of memory required to store the predicted outcomes for each of those possible patterns.

It is common within real life program code to have program loops which are typically executed a large number of times before the loop is exited. Such behavior produces a long sequence of repeated final branch taken outcomes terminated by a branch not taken result as the program drops out of the program loop. It is impractical to provide a branch prediction memory capable of storing a long previous branch outcome history sufficient to capture such loop behavior and yet mispredicting such loop ends nevertheless results in a significant performance impact.

SUMMARY OF THE INVENTION

Viewed from one aspect the present invention provides apparatus for processing data, said apparatus comprising:

a pipelined processing circuit operable to execute program instructions including conditional branch instructions generating branch outcomes; and a branch prediction circuit operable to generate predictions of branch outcomes of conditional branch program instructions to be executed by said pipelined processing circuit; and a prefetch circuit operable to supply a stream of program instructions to said pipelined processing circuit for execution in dependence upon said predictions; wherein said branch prediction circuit comprises:

a branch history register operable to store a branch history value indicative of a preceding sequence of branch outcomes;

a branch prediction memory having prediction memory storage locations addressed in dependence upon at least said branch history value, a prediction memory storage location addressed by a given branch history value being operable to store a first prediction of a branch outcome as either branch taken or branch not taken for a next conditional branch instruction following a given preceding sequence of branch outcomes corresponding to said given branch history value;

an extended pattern cache operable to detect one or more repeating patterns of branch outcomes of a length greater than those stored in said branch history register and terminated by terminal branch outcomes not following said repeating pattern and to store representations of a plurality of instances of such detected repeating patterns together with their respective final branch outcome for subsequent use as a second prediction when said repeating pattern of outcomes is detected; and a branch prediction selector operable to select for use by said prefetch circuit either said second prediction when said extended pattern cache subsequently detects said repeating pattern of branch outcomes or a first prediction from said branch prediction memory when said extended pattern cache subsequently does not detect said repeating pattern of branch outcomes.

The present technique provides that a standard branch prediction memory using a relatively short history value register and accordingly requiring a relatively small branch prediction memory. Whilst this branch prediction memory is not able to cope with medium to long length loops, the extended pattern cache is provided to store extended history values composed of repeating patterns which are typical of loop behavior. The detected patterns themselves are stored within the extended pattern cache which needs only relatively few cache lines since statistically it is unlikely that a large number of active loops will be present within a single program. Thus, loop behavior which would exceed the capabilities of a relatively small branch prediction memory is explicitly detected by the extended pattern cache and that behavior then stored within the extended pattern cache such that when it re-occurs an accurate prediction of the end of the loop concerned may be made therefore significantly improving the prediction accuracy of the system whilst requiring relatively little additional circuit overhead.

It will be appreciated that the repeating patterns that are detected could take a variety of forms but in preferred embodiments the most common form of a repeating pattern is that of consecutive branch taken outcomes. Alternatively, within a loop having an early terminate check, a pattern of repeated taken and not taken outcomes or groups of such patterns may be detected and stored.

In order to assist in the extended pattern cache being able to distinguish between multiple loops, some of which will be shorter than others, these are identified by pattern prefixes which occur for the branch outcomes preceding the start of those loops with these pattern prefixes being stored within the extended pattern cache in association with the pattern. The prefixes are detected in addition to the patterns to assist in accurately identifying that pattern when it is being used for subsequent prediction.

The representations of the patterns detected are advantageously stored in a compressed form within the extended pattern cache to reduce circuit overhead.

A particularly effective form of compression is one in which a single bit within the representation is used to indicate a complete repeat of a repeating pattern, such as a predetermined number of consecutive branch taken outcomes.

The representation advantageously terminates with a representation of a plurality branch outcomes representing part of a complete repeat.

In order to avoid undesired alteration of the branch prediction memory and its associated first predictions, updating of these is suppressed when an actual outcome of a conditional branch instruction becomes known if that actual outcome was generated based upon one of a second prediction.

The extended pattern cache preferably includes a cache victim selector operable to select a cache victim within the extended pattern cache to be replaced when a new pattern is to be stored therein. A round-robin algorithm is particularly well suited to this application.

Viewed from another aspect the present invention provides a method of processing data, said method comprising:

executing program instructions including conditional branch instructions generating branch outcomes with a pipelined processing circuit; and generating predictions of branch outcomes of conditional branch program instructions to be executed by said pipelined processing circuit with a branch prediction circuit; and supplying a stream of program instructions to said pipelined processing circuit for execution in dependence upon said predictions with a prefetch circuit; wherein said step of prediction comprises:

storing a branch history value indicative of a preceding sequence of branch outcomes;

addressing prediction memory storage locations within a branch prediction memory in dependence upon at least said branch history value, a prediction memory storage location addressed by a given branch history value being operable to store a first prediction of a branch outcome for a next conditional branch instruction following a given preceding sequence of branch outcomes corresponding to said given branch history value;

detecting with one or more repeating patterns of branch outcomes of a length greater than those stored in said branch history register and terminated by terminal branch outcomes not following said repeating pattern and storing within an extended pattern cache representations of a plurality of instances of such detected repeating patterns together with their respective final branch outcome for subsequent use as a second prediction when said repeating pattern of outcomes is detected; and selecting for use by said prefetch circuit either said second prediction when said repeating pattern of branch outcomes is subsequently detected or a first prediction from said branch prediction memory when said repeating pattern of branch outcomes is not detected.

The above, and other objects, features and advantages of this invention will be apparent from the following detailed description of illustrative embodiments which is to be read in connection with the accompanying drawings.

BRIEF DESCRIPTION OF THE DRAWINGS

An embodiment of the invention will now be described by way of example only, with reference to the accompanying drawings in which.

DESCRIPTION OF THE PREFERRED EMBODIMENTS

Figure 1:
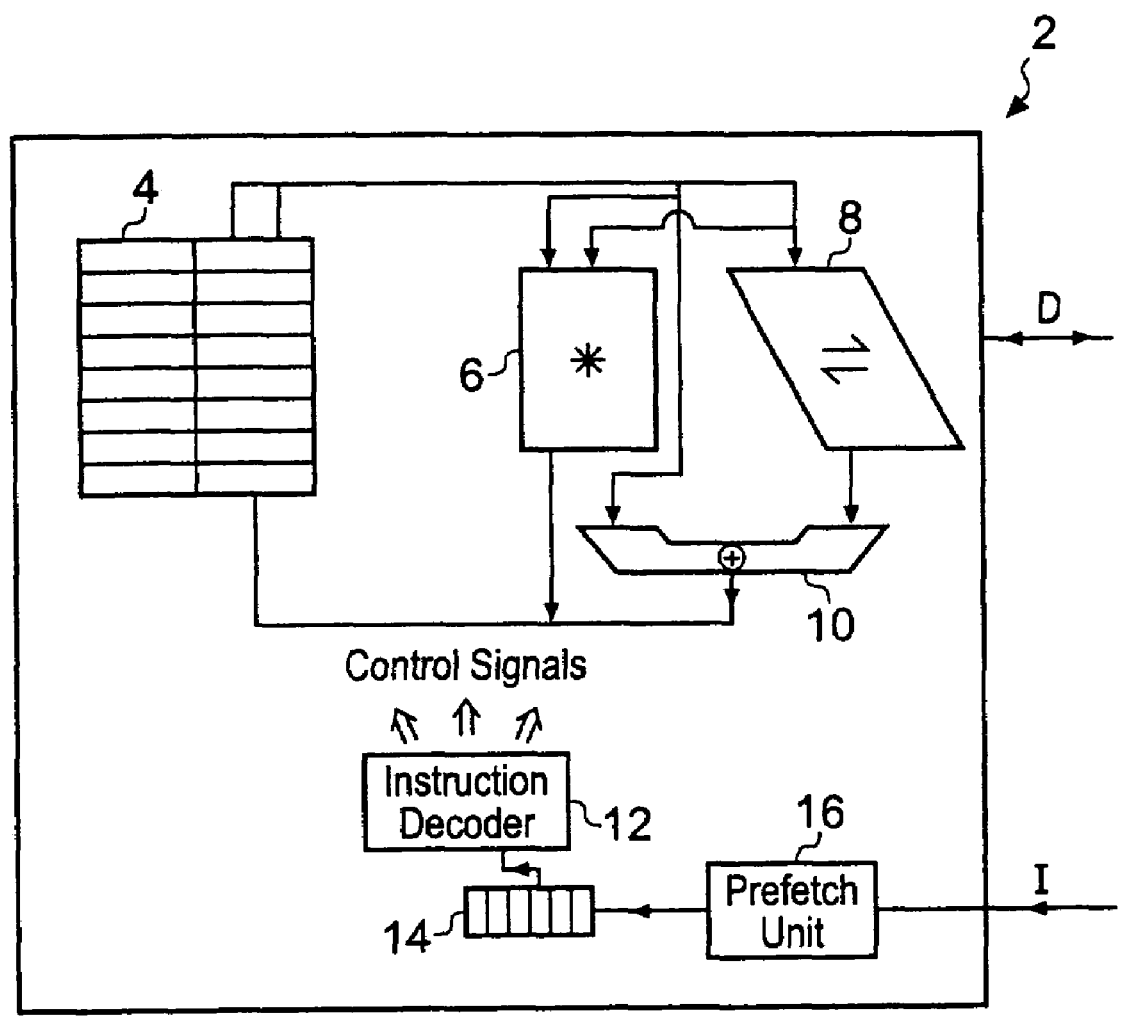
FIG. 1 schematically illustrates a data processing system.

FIG. 1 illustrates a data processing system 2, such as an embedded data processing core. The data processing system 2 as illustrated includes a register bank 4, a multiplier 6, a shifter 8, an adder 10, an instruction decoder 12, an instruction pipeline 14 and a prefetch unit 16. It will be appreciated that in practice the data processing system 2 will incorporate many more circuit elements. The circuit elements illustrated in FIG. 1 have been simplified and illustrate how instructions I are fetched by the prefetch unit 16 and then supplied to the instruction pipeline 14. Program instructions within the instruction pipeline 14 control an instruction decoder 12 which then generates control signals which configure the register bank 4, the multiplier 6, the shifter 8 and the adder 10 to perform desired data processing operations.

Figure 2:
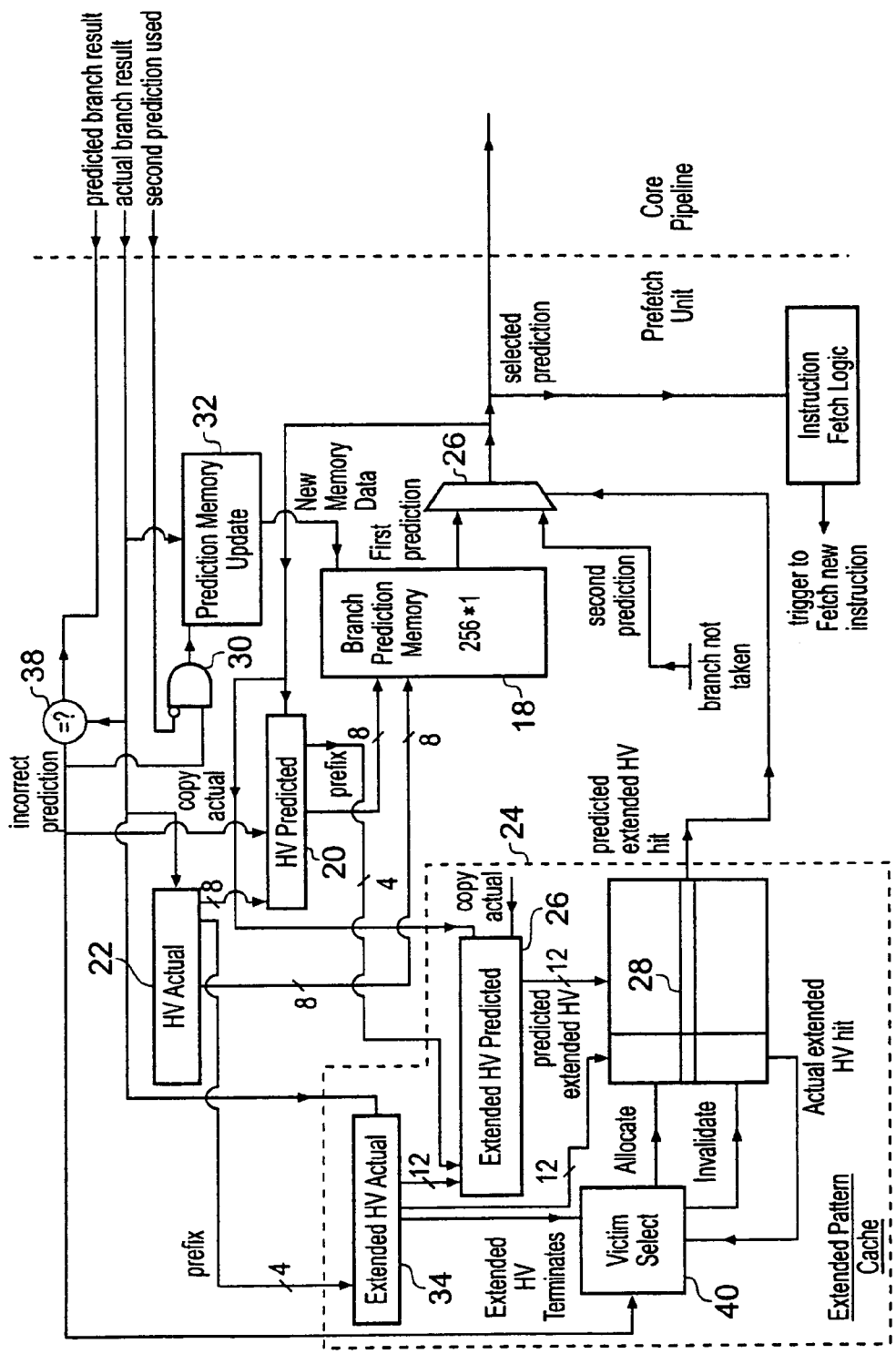
FIG. 2 schematically illustrates part of a prefetch unit within a data processing system.

FIG. 2 schematically illustrates a part of the prefetch unit 12 that deals with branch prediction. This includes a branch prediction memory 18 which is addressed by a predicted history value stored within a predicted history value register 20. An actual history value is maintained within an actual history value register 22 which is updated on the basis of actual branch results fed back from the instruction pipeline 14. The branch prediction memory 18 outputs a first prediction as to whether or not a newly encountered conditional branch instruction will or will not be taken. If no prediction is received from an extended pattern cache 24, described in more detail below, then this first prediction is selected by a multiplexer 26 for output to the instruction pipeline 14 and is used within the prefetch unit 12 to direct the fetching of subsequent instructions. The multiplexer 26 serves as a branch prediction selector.

The extended pattern cache 24 serves to detect repeated patterns of branch outcomes, in this case of branch taken results, which would overflow the predicted history value register 20. As an example, the extended history value register 26 as illustrated is operable to detect runs of between 8 and 32 branch taken outcomes terminated by a branch not taken outcome. Such branch outcome behaviors are relatively common as a result of program loops and accordingly the hardware overhead associated with the provision of the extended pattern cache 24 is justified by the performance gain achieved through more accurately predicting loop ends. Furthermore, the action of the extended pattern cache 24 is in parallel with the branch prediction memory 18 and accordingly does not slow down the other branch prediction mechanism. When an extended history value comprising a sequence of branch taken outcomes is detected to exceed the length for which a specific prediction can be stored within the branch prediction memory 18, then a representation of that detected branch pattern is stored within a cache line 28 (one of a plurality). Accordingly, when that pattern is subsequently detected then a hit will be generated from the cache line 28 and a second prediction of branch not taken will be selected by the multiplexer 26 and used by the prefetch unit 12 and instruction pipeline 14 in preference to the first prediction.

An actual history value register 22 associated with the branch prediction memory 18 serves to store an actual history value as returned from the instruction pipeline 14 to the prefetch unit 12. When a mismatch is detected by a comparator 38 between an actual branch result for a given conditional branch instruction and the predicted branch result which was recorded by the instruction pipeline 14 and passed back with the actual branch result, then this indicates that an incorrect branch prediction was made. If the branch prediction concerned was made upon the basis of a second prediction from the extended pattern cache 24, then no update to the branch prediction memory 18 is made based upon this incorrect prediction by virtue of the gate 30 blocking the incorrect prediction signal from reaching a prediction memory update circuit 32. If the incorrect prediction was made based upon a first prediction, then the incorrect prediction signal reaches the prediction memory update circuit 32 and the actual history value stored within the actual history value register 22 is used to address the appropriate entry in the branch prediction memory 18 which gave rise to the incorrect prediction and the actual branch result is written into that memory location by the branch prediction memory update circuit 32.

The action of the pattern detection within the extended pattern cache 24 is to detect runs of branch taken outcomes following a branch not taken outcome. If these runs exceed eight branch taken outcomes, then this corresponds to an extended history value which should be cached within one of the cache lines 28 and may be used for subsequent prediction. Each time a branch not taken outcome is detected, the extended history value is reset to start to count branch taken outcomes following that newly detected branch not taken outcome. At the same time as this reset, a four outcome prefix preceding the branch taken outcome is captured from the actual history value register 22 into an extended actual history value register 34 as well as a corresponding prefix capture taking place from the predicted history value register 20 into the predicted extended history value register 26.

Should an incorrect prediction be detected by the comparator 38, this is signaled to a victim select circuit 40 within the extended pattern cache 24 and used to invalidate any cache line 28 that matches the current value within the actual extended history value register 34, i.e. there is an actual extended history value hit. When the actual extended history value register 34 detects termination of a run of between nine and thirty two branch taken outcomes and this does not result in a hit for any of the already stored cache lines 28, then the victim select circuit 40 allocates a cache line 28, using a standard round-robin algorithm, into which the newly detected run is stored.

Figure 3:
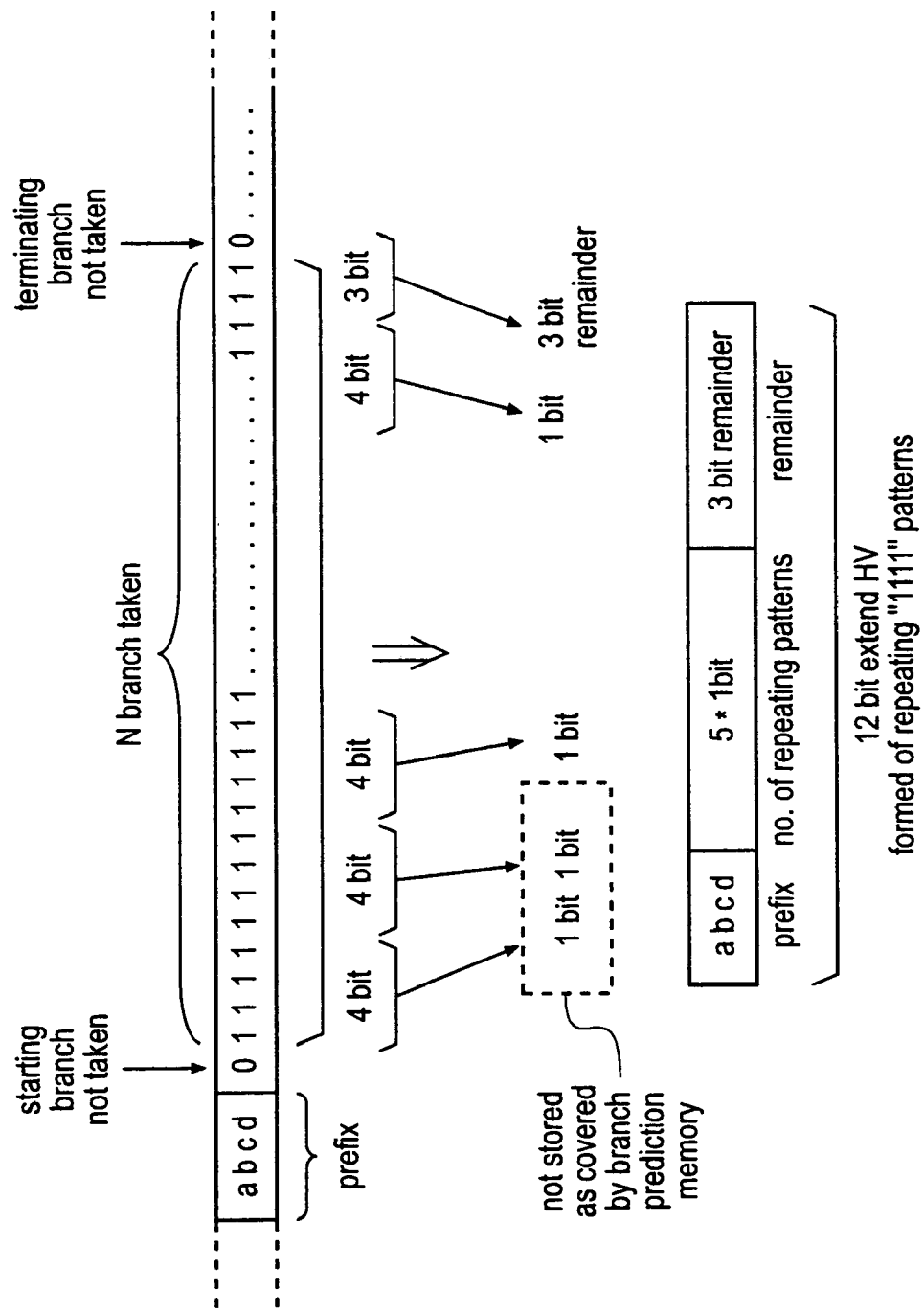
FIG. 3 schematically illustrates how a repeating pattern of branch outcomes may be represented in a compressed form.

FIG. 3 schematically illustrates how the repeating pattern of branch taken outcomes may be represented in a compressed form within the extended pattern cache 24. A 4-bit prefix "abcd" is used to identify different runs. Each run is preceded by a branch not taken outcome and itself comprises N branch taken outcomes. If fewer than nine branch taken outcomes occur before the run terminates, then this is not cached as such behavior is dealt with by the branch prediction memory 18. If greater than eight branch taken results occur, then for each complete repeating pattern within this run a single bit is set within the compressed representation. Five such bits each representing four branch taken outcomes (a pattern of four ones) in the run are provided within the compressed representation. A 3-bit field at the end of the representation gives the final bits, up to a maximum of three, preceding the terminating branch not taken outcome.

Figure 4:
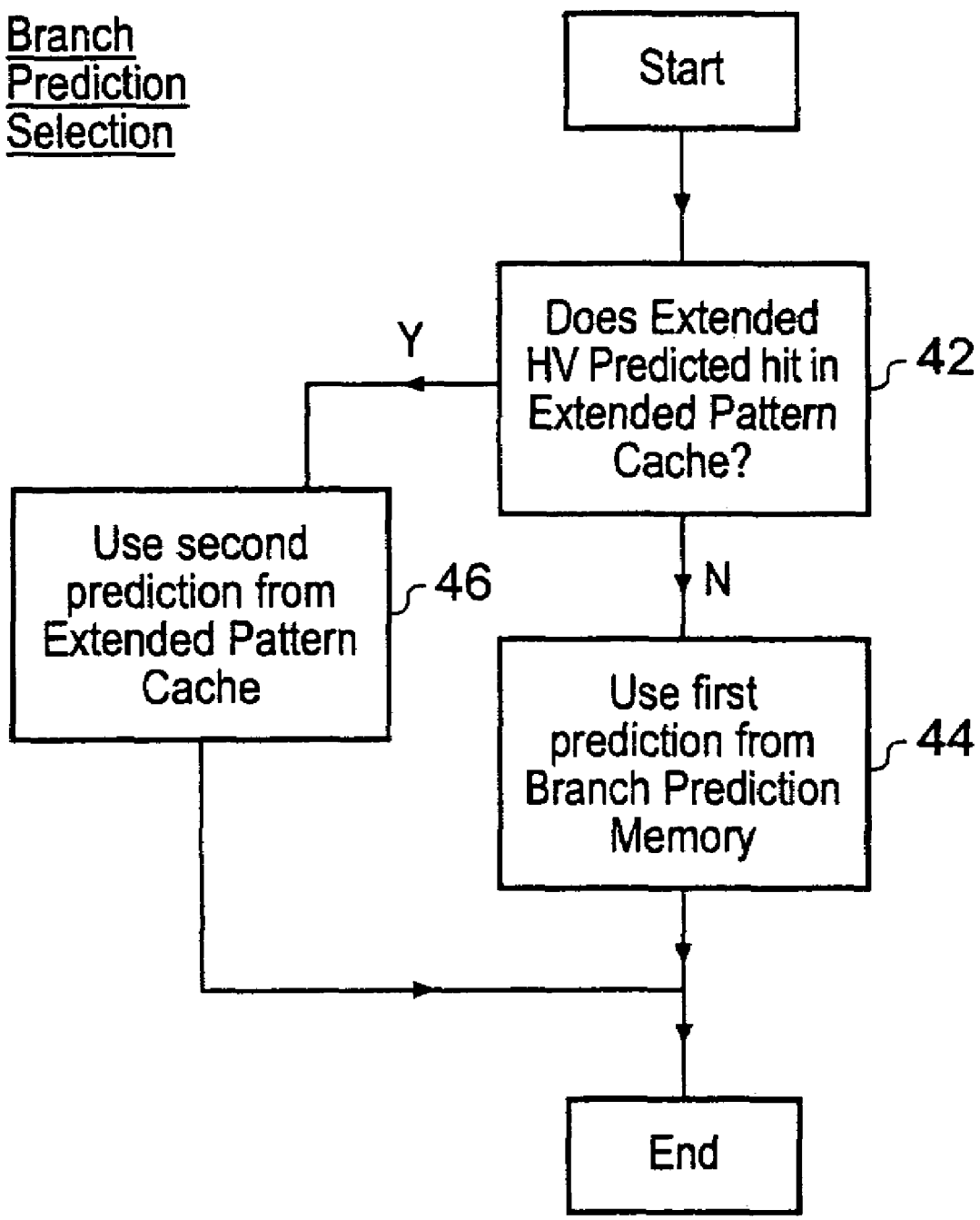
FIG. 4 is a flow diagram schematically illustrating branch prediction selection.

FIG. 4 is a flow diagram schematically illustrating branch prediction selection as performed by the multiplexer 26. At step 42 a determination is made as to whether or not there is a hit within the extended pattern cache 24. If there is no hit, then the first prediction from the branch prediction memory 18 is used at step 44. If there is a hit, then the second prediction (in this case always a branch not taken prediction) is used at step 46.

Figure 5:
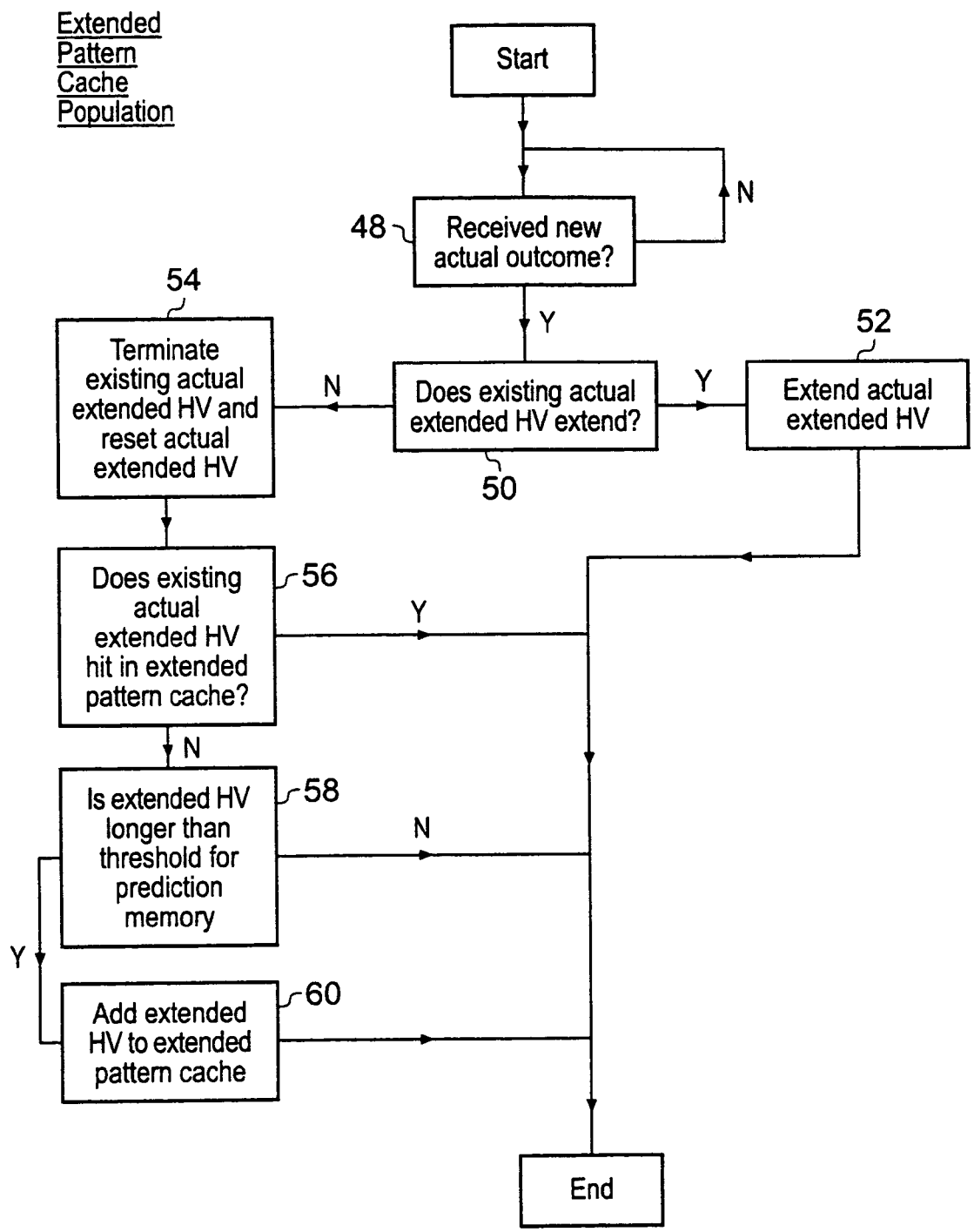
FIG. 5 is a flow diagram schematically illustrating extended pattern cache population.

FIG. 5 is a flow diagram schematically illustrating how the extended pattern cache 24 is populated. As step 48 a new actual outcome is received from the instruction pipeline 14. If this is a branch taken outcome, then it may serve to extend an existing run of branch taken outcomes and this is detected by step 50 and processing proceeds to step 52 at which the recorded run of branch taken outcomes is incremented in accordance with the representation illustrated in FIG. 3. In practice, a simple state machine is used to advance the representation through the required states as each branch taken outcome is received. If the determination at step 50 is that the existing run of branch taken outcomes is not extended, i.e. a branch not taken result has been received, then step 54 serves to terminate the existing actual extended history value and resets this actual extended history value to start recording a new run. In practice such resetting captures a new prefix value from the actual history value register 22 associated with the branch prediction memory 18 and resets the count bits all to indicate zero. Step 56 then determines whether or not the existing actual extended history value (i.e. the history value which was in place prior to the reset) produced a hit within the extended pattern cache. If a hit did occur, then that pattern was already stored within the extended pattern cache and need not be added. If a hit did not occur, then step 58 determines whether or not the new run that has been detected is long enough to justify being stored within the extended pattern cache. Runs of less than nine are not stored. If the new run is of sufficient length, then step 60 serves to store the compressed representation of this run (including prefix) into a cache line 28 as allocated by the victim select circuit 40.

Figure 6:
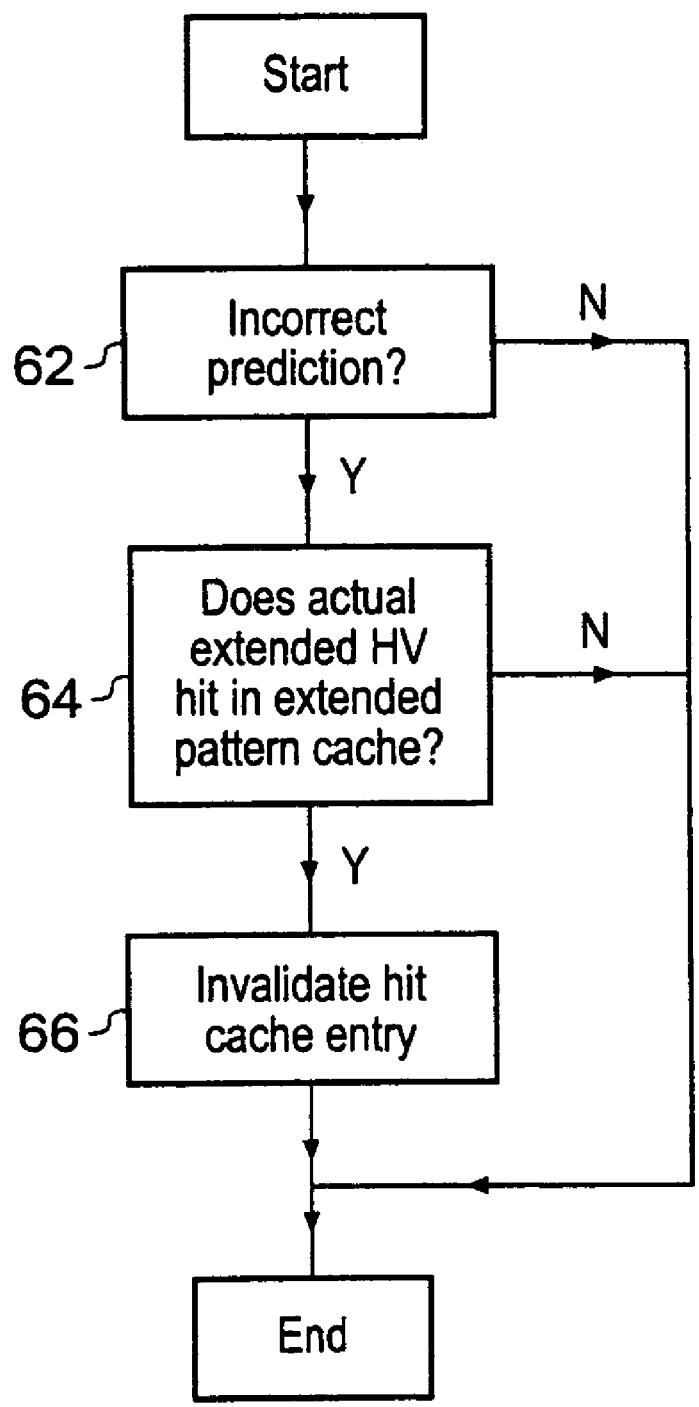
FIG. 6 is a flow diagram schematically illustrating extended pattern cache updating.

FIG. 6 is a flow diagram schematically illustrating extended pattern cache updating. At step 62 an incorrect prediction as detected by the comparator 38 is sensed. Step 64 then determines whether the actual extended history value present within the actual extended history value register 34 currently hits within the extended pattern cache 24. If there is no hit, then an extended history value was not being used to predict that outcome which resulted in the incorrect prediction. If there is a hit, then this indicates that the extended pattern cache 24 is holding a corresponding representation of a run which it wrongly predicts as being terminated at that point and accordingly step 66 invalidates that cache entry.

Figure 7:
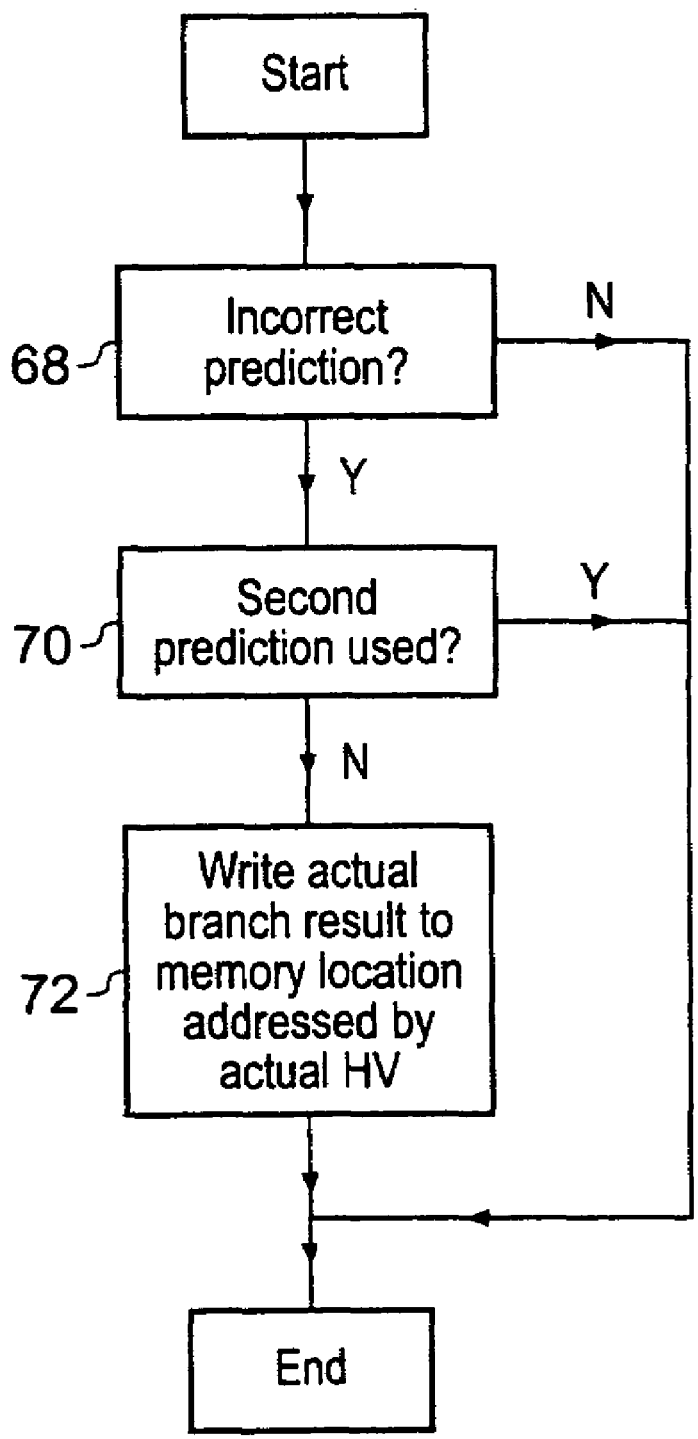
FIG. 7 is a flow diagram schematically illustrating prediction memory updating.

FIG. 7 is a flow diagram schematically illustrating prediction memory updating. Step 68 serves to detect an incorrect prediction signal. Step 70 aborts any updating of the prediction memory if it is determined that the incorrect prediction was based upon a second prediction value taken from the extended pattern cache 24 rather than a first prediction taken from the branch prediction memory 18. If the incorrect prediction was one based upon a first prediction from the branch prediction memory 18, then step 72 serves to write the actual branch result which has been returned into the memory location addressed by the value currently stored within the actual history value register 22.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    a pipelined processing circuit configured to execute program instructions including conditional branch instructions generating branch outcomes; and
    a branch prediction circuit configured to generate predictions of branch outcomes of conditional branch program instructions to be executed by said pipelined processing circuit; and
    a prefetch circuit configured to supply a stream of program instructions to said pipelined processing circuit for execution in dependence upon said predictions; wherein said branch prediction circuit comprises:
    a branch history register configured to store a branch history value indicative of a preceding sequence of branch outcomes;
    a branch prediction memory having prediction memory storage locations addressed in dependence upon at least said branch history value, a prediction memory storage location addressed by a given branch history value being configured to store a first prediction of a branch outcome as either branch taken or branch not taken for a next conditional branch instruction following a given preceding sequence of branch outcomes corresponding to said given branch history value;
    an extended pattern cache configured to detect a length of one or more repeating patterns of branch outcomes that is greater than a length of those stored in said branch history register and terminated by terminal branch outcomes not following said repeating pattern and to store representations of a plurally of instances of such detected repeating patterns together with their respective final branch outcome for subsequent use as a second prediction when said repeating pattern of outcomes is detected; and
        a branch prediction selector configured to select for use by said prefetch circuit either said second prediction when said extended pattern cache subsequently detects said repeating pattern of branch outcomes or a first prediction from said branch prediction memory when said extended pattern cache subsequently does not detect said repeating pattern of branch outcomes.

2. Apparatus as claimed in claim 1, wherein said extended pattern cache is configured to detect a repeating pattern of consecutive branch taken outcomes.

3. Apparatus as claimed in claim 1, wherein said extended pattern cache stores a branch outcome pattern prefix with each stored repeating pattern of branch outcomes, a subsequent occurrence of said repeating pattern of branch outcomes being detected upon detection of a match with said branch outcome pattern prefix and said repeating pattern of branch outcomes.

4. Apparatus as claimed in claim 1, wherein said extended pattern cache stores said representations of a plurality of such detected repeating patterns.

5. Apparatus as claimed in claim 1, wherein said extended pattern cache stores said representation in a compressed form.

6. Apparatus as claimed in claim 5, wherein said compressed form uses a bit to represent each complete repeat within said repeating pattern of branch outcomes.

7. Apparatus as claimed in claim 6, wherein a complete repeat comprises four consecutive branch taken outcomes.

8. Apparatus as claimed in claim 6, wherein said terminal branch outcomes comprise a plurality of branch outcomes forming part of a complete repeat.

9. Apparatus as claimed in claim 1, wherein updating of first predictions within said branch prediction memory using actual outcomes of conditional branch instruction branch instructions that were predicted using second predictions from said extended pattern cache is suppressed.

10. Apparatus as claimed in claim 1, wherein said extended pattern cache includes a cache victim selector configured to select a stored representation of a repeating pattern of branch outcomes to be evicted from said extended pattern cache when a new repeating pattern of branch outcomes is detected.

11. Apparatus as claimed in claim 10 wherein said cache victim selector uses a round robin algorithm.

12. A method of processing data, said method comprising:
    executing program instructions including conditional branch instructions generating branch outcomes with a pipelined processing circuit; and
    generating predictions of branch outcomes of conditional branch program instructions to be executed by said pipelined processing circuit with a branch prediction circuit; and
    supplying a stream of program instructions to said pipelined processing circuit for execution in dependence upon said predictions with a prefetch circuit; wherein said step of prediction comprises:
    storing a branch history value indicative of a preceding sequence of branch outcomes;
    addressing prediction memory storage locations within a branch prediction memory in dependence upon at least said branch history value, a prediction memory storage location addressed by a given branch history value being configured to store a first prediction of a branch outcome for a next conditional branch instruction following a given preceding sequence of branch outcomes corresponding to said given branch history value;
    detecting a length of one or more repeating patterns of branch outcomes that is greater than a length of those stored in said branch history register and terminated by terminal branch outcomes not following said repeating pattern and storing within an extended pattern cache representation of a plurality of instances of such detected repeating patterns together with their respective final branch outcome for subsequent use as a second prediction when said repeating pattern of outcomes is detected; and
    selecting for use by said prefetch circuit either said second prediction when said repeating pattern of branch outcomes is subsequently detected or a first prediction from said branch prediction memory when said repeating pattern of branch outcomes is not detected.

13. A method as claimed in claim 12, wherein said step of detecting detects a repeating pattern of consecutive branch taken outcomes.

14. A method as claimed in claim 12, wherein said extended pattern cache stores a branch outcome pattern prefix with each stored repeating pattern of branch outcomes, a subsequent occurrence of said repeating pattern of branch outcomes being detected upon detection of a match with said branch outcome pattern prefix and said repeating pattern of branch outcomes.

15. A method as claimed in claim 12, wherein said extended pattern cache stores said representations of a plurality of such detected repeating patterns.

16. A method as claimed in claim 15, wherein said extended pattern cache stores said representations in a compressed form.

17. A method as claimed in claim 16, wherein said compressed form use a bit to represent each complete repeat within said repeating pattern of branch outcomes.

18. A method as claimed in claim 17, wherein a complete repeat comprises four consecutive branch taken outcomes.

19. A method as claimed in claim 17, wherein said terminal branch outcomes comprise a plurality of branch outcomes forming part of a complete repeat.

20. A method as claimed in claim 12, wherein updating of first predictions within said branch prediction memory using actual outcomes of conditional branch instruction branch instructions that were predicted using second predictions from said extended pattern cache is suppressed.

21. A method as claimed in claim 12, wherein said extended pattern cache includes a cache victim selector configured to select a stored representation of a repeating pattern of branch outcomes to be evicted from said extended pattern cache when a new repeating pattern of branch outcomes is detected.

22. A method as claimed in claim 21, wherein said cache victim selector uses a round robin algorithm.

* * * * *